United States Patent [19]
Tompkin et al.

[11] Patent Number: 5,882,463
[45] Date of Patent: Mar. 16, 1999

[54] METHOD OF APPLYING A SECURITY ELEMENT TO A SUBSTRATE

[75] Inventors: Wayne Robert Tompkin, Ennetbaden; René Staub, Cham, both of Swaziland

[73] Assignee: Landis & Gyr Technology Innovation AG, Zug, Swaziland

[21] Appl. No.: 614,513

[22] Filed: Mar. 13, 1996

[30] Foreign Application Priority Data

May 5, 1995 [EP] European Pat. Off. ........... 95810302.0

[51] Int. Cl.[6] .............................. B32B 31/04; B44C 1/17
[52] U.S. Cl. ..................... 156/234; 156/239; 156/240; 156/247; 156/272.8; 156/275.3; 156/290
[58] Field of Search ................... 156/247, 272.8, 156/275.1, 275.3, 275.7, 290, 234, 239, 240

[56] References Cited

U.S. PATENT DOCUMENTS

| | | |
|---|---|---|
| 4,624,891 | 11/1986 | Sato et al. . |
| 4,861,407 | 8/1989 | Volkmann et al. . |
| 4,911,302 | 3/1990 | Butler . |
| 5,104,471 | 4/1992 | Antes et al. . |
| 5,106,288 | 4/1992 | Hughes . |
| 5,251,937 | 10/1993 | Ojster . |
| 5,292,559 | 3/1994 | Joyce, Jr. et al. . |
| 5,319,476 | 6/1994 | Yamazaki et al. . |
| 5,464,690 | 11/1995 | Boswell . |
| 5,489,551 | 2/1996 | Castleberry . |
| 5,500,069 | 3/1996 | Ogue et al. . |

FOREIGN PATENT DOCUMENTS

| | | |
|---|---|---|
| 0 105 099 B1 | 1/1986 | European Pat. Off. . |
| 0311323 | 12/1989 | European Pat. Off. . |
| 0 401 466 A1 | 12/1990 | European Pat. Off. . |
| 0 375 833 B1 | 2/1993 | European Pat. Off. . |
| 0 648 613 A1 | 4/1995 | European Pat. Off. . |
| 1299089 | 12/1989 | Japan . |
| 3142294 | 6/1991 | Japan . |
| WO 93/16888 | 9/1993 | WIPO . |

*Primary Examiner*—Michael W. Ball
*Assistant Examiner*—Sam Chuan Yao
*Attorney, Agent, or Firm*—Meltzer, Lippe, Goldstein et al.

[57] ABSTRACT

In a method of transferring a security element which is in the form of a laminate with a carrier foil and with a thermally activatable adhesive layer for connection to a substrate onto a document the adhesive layer is brought into contact with the substrate and locally heated by the supply of heat energy through the laminate. After the adhesive layer cools if necessary the carrier foil can be pulled off the substrate, in which case the carrier foil, at the locations adhering to the substrate, is detached from the rest of the laminate and the laminate tears along the boundary between the adhering and the non-adhering locations so that only the adhering locations of the laminate remain behind on the substrate. In particular a laser beam or an array of laser or light emitting diodes is suitable for the supply of heat energy. The laminate preferably has diffraction structures or layers producing optical interference effects. The alignment of the laminate and the substrate can be effected in accurate register relationship.

13 Claims, 3 Drawing Sheets

Fig. 7

METHOD OF APPLYING A SECURITY ELEMENT TO A SUBSTRATE

BACKGROUND OF THE INVENTION

1. Field of the Invention

The invention generally concerns a method of applying and individualising or personalising a security element to a substrate or document.

Individualised, invariable security elements serve to protect the document provided therewith from unauthorised copying, from forgeries or from unauthorised alterations in the document.

2. Description of the Prior Art

European patent application No. EP 401 466 discloses a security element in the form of a composite laminate, for sticking onto a document. The laminate has diffraction structures which are embedded between a stabilisation layer and a thermally activatable adhesive layer. Transfer of the laminate onto the document is effected by a procedure whereby heat is supplied to the adhesive layer through the laminate, in which case the stabilisation layer uniformly distributes the heat and prevents locally excessive heating of the layers of lacquer which carry the diffraction structures. The composite laminate serves as a security element because of its optical effects which are produced by the diffraction structures.

EP 401 466 further discloses the formation of locations which have good and poor adhesion on the adhesive layer. In the thermal activation operation, an adhesive bond is formed between the composite laminate and the document, only at the locations which afford good adhesion. In the event of an attempt being made to detach it from the document, on the one hand the security element is destroyed. On the other hand, pieces of the security element remain behind on the document, according to the pattern of the adhesive bridge portions. The pattern which remains behind may be a pattern which has a meaning and for example may represent the word "VOID".

PCT application No. WO 93/16888 discloses a printing process for forming the adhesive layer of a composite laminate with locations which have good and poor adhesion. After the laminate has been transferred onto the document the carrier foil is pulled off again, in which case the carrier foil is detached from the laminate at the locations thereof which have good adhesion on the document, while at the locations which have poor adhesion the entire laminate is detached from the document. The parts of the laminate which remain behind on the document are in part finely structured images and cannot be removed from the document without leaving visible traces behind. Such parts may for example be present as fine lines on a photograph so that the photograph is clearly visible between the parts representing the security element.

Japanese Patent Abstract Vol. 15, No. 362 (M-1157) discloses a method in which a thermoplastic foil is applied to a chip card, as a scratch-proof protective layer. In order to prevent the foil from being subsequently peeled off, the surface of the chip card, which has an adhesive layer, is heated at critical locations by means of a laser beam which passes through the foil, to such an extent that the chip card, the adhesive layer and the foil are welded together.

SUMMARY OF THE INVENTION

An object of the present invention is to propose a simple reliable method of applying a security element to a substrate or a document, if necessary in accurate register relationship. The invention seeks to provide that the method permits the transfer of finely structured patterns onto the substrate, the fine patterns representing the security element. The invention also seeks to provide that the method is suitable for individualising and/or personalising documents.

In accordance with the invention there is provided a method of transferring a security element onto a substrate, wherein said security element comprises a composite laminate comprising at least one carrier foil, a thermally activatable adhesive layer for connection to said substrate, and optical diffraction structures and/or a layer pack of layers producing interference effects, the method comprising: bringing said adhesive layer into contact with said substrate; and supplying energy through said laminate to locally heat said adhesive layer so that said laminate adheres to said substrate at the heated locations without said diffraction structures or said layer pack being destroyed.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
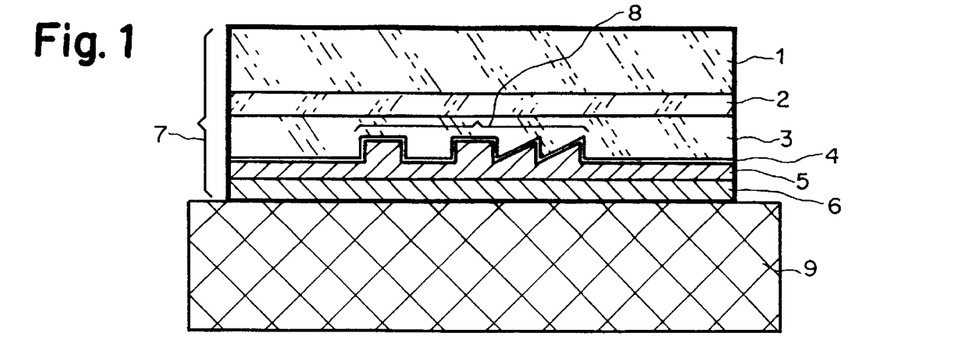
FIG. 1 is a view in cross-section of a composite laminate which is fixed by adhesive onto a substrate.

In FIG. 1 reference numeral 1 denotes a carrier layer on which there are disposed in the specified sequence an intermediate layer 2, a first lacquer layer 3, a reflecting reflection layer 4, a second lacquer layer 5 and an adhesive layer 6. The layers 1 through 6 form a composite laminate 7. Embedded between the lacquer layers 3 and 5 are optical diffraction structures 8, for example gratings, holograms or diffraction structures as are known from European patent specification EP 105 099, which diffract light impinging through the lacquer layer 3 and at least partially reflect it. The laminate 7 is glued to a substrate 9 by means of a method which is discussed in greater detail hereinafter at predetermined locations, the adhesive layer 6 lying on the substrate 9.

The diffraction structures 8 are microscopically fine relief structures whose geometrical parameters of line spacing, orientation and profile shape vary locally in a predetermined manner in such a way that, when the substrate 9 is viewed and moved under normal lighting conditions, they produce striking, changing optical-diffraction effects such as for example different color effects or changes between light and dark. A further optical effect may be that adjacent surface elements are visible in a different level of brightness or a different color, wherein when the substrate 9 is turned or tilted the relative brightness or color of the surface elements changes. The diffraction structures 8 may produce in particular the changing optical effects as are known from holograms or optical variable devices as are described for example in European patent specification EP 375 833. The optical effects of the diffraction structures 8 represent a feature which can be easily visually checked.

A foil of polyester for example is highly suitable for the carrier layer 1 as polyester foils are distinguished by a high level of tensile strength and a high level of resistance to temperature. Such foils are commercially available in various thicknesses on rolls so that the laminate 7 is advantageously built up, as described hereinafter, on one side of the carrier layer 1, by means of a re-rolling installation (not shown here). The carrier layer 1 is advantageously of a thickness of at least 6 micrometers so that it is sufficiently tear-resistant. A thickness of 20 mm is preferred. In regard to certain uses however the thickness readily attains 50 mm. The carrier layer 1 and, if present, the intermediate layer 2, form a carrier foil.

If it is necessary for the carrier layer 1 and the intermediate layer 2 to be easily detached from the lacquer layer 3 in a later step in the procedure, the intermediate layer 2 is for example a wax layer which is applied over its entire surface area to the carrier layer 1 with an application thickness of preferably 0.1 micrometer. If the carrier layer 1 and the intermediate layer 2 are not to be later separated from the remainder of the laminate 7, a primer of an application thickness in the micrometer range, preferably in the range of 0.8 through 2 micrometers, serves as the intermediate layer 2. The primer provides for a high level of adhesiveness between the carrier layer 1 and the subsequent lacquer layer 3. A lacquer based on polyurethane advantageously serves as the primer so that the intermediate layer 2 is resistant to light, in particular ultra-violet light, and solvents.

In the latter case the lacquer layer 3 may also be directly applied to the carrier layer 1 if the adhesiveness of the lacquer layer 3 on the carrier layer 1 is sufficient. Advantageously the adhesiveness can be enhanced by means of a preliminary treatment of the carrier layer 1, for example in a corona or plasma discharge. In these examples a boundary or interface layer between the lacquer layer 3 and the carrier layer 1 or a surface layer on the foil, which is altered by the preliminary treatment, takes over the function of the intermediate layer 2.

In the former case also the lacquer layer 3 can be directly applied to the carrier layer 1 if the adhesiveness of the lacquer layer 3 on the carrier layer 1 is so matched that, after the laminate 7 is joined to the substrate 9, the carrier layer 1 can be easily separated from the lacquer layer 3 at those locations of the laminate 7 which adhere to the substrate 9, and, at those locations of the laminate 7 which do not adhere to the substrate 9, the carrier layer 1 also pulls with it the layers 3, 4, 5 and 6 of the laminate 7, in which case the layers 3, 4, 5 and 6 tear along the boundary between the adhering and the non-adhering locations of the laminate 7.

Advantageously, foils which have already been coated with the intermediate layer 2 by the supplier can possibly be used for the carrier layer 1.

The first lacquer layer 3 is advantageously applied in at least one working operation and is typically of a thickness of between 0.5 and 3.0 micrometers, preferably 1.5 micrometers.

The diffraction structures 8 are impressed into the lacquer layer 3 for example by means of a heated embossing die, in the form of microscopically fine relief structures, the lacquer layer 3 in that case comprising thermoplastic material. Such an embossing method is known for example from Swiss patent specification No. 661 683. In a further method as is known from U.S. Pat. Nos. 4,758,296 and 4,840,757, the diffraction structures 8 are produced in the lacquer layer 3 by molding, in which case the lacquer layer 3 comprises UV-hardenable lacquer.

The reflection layer 4 is then applied to the lacquer layer 3, which is advantageously subjected to a preliminary treatment by means of a corona discharge in order to ensure good adhesion of the reflection layer 4 on the lacquer layer 3. Preferably a metal is applied by vapor deposition as the reflection layer 4, for example aluminum, which is inexpensive and which provides for good reflection of visible and infra-red light when present in just thin layers. Advantageously, a dielectric is also suitable as the reflection layer 4, with a refractive index which differs as greatly as possible from the adjacent layers 3 and 5 so that the diffraction structures 8 are partially transparent and do not completely cover over materials which are therebeneath, for example an image or picture.

It is also possible for the diffraction structure 8 to be embossed into the lacquer layer 3 after the reflection layer 4 has been applied.

The relief of the diffraction structures 8 has a typical profile height which is in the range of from about 0.1 through 1.5 micrometers, while the grating spacing of the diffraction structures 8 is about 0.1 through 10 micrometers. Application of the second lacquer layer 5 of about 0.15 through 1.5 micrometers in thickness (for example 1 micrometer) completely levels out the relief. The same material is advantageously used for both lacquer layers 3 and 5, for example a thermoplastic acrylic polymer lacquer. The second lacquer layer 5 predominantly serves as a primer between the reflection layer 4 and the adhesive layer 6. It is also possible to forego same.

The acrylic polymer lacquer of the lacquer layer 3 can be so colored that it is transparent at least in a predetermined part of the light spectrum. The diffraction structure 8 remains mechanically or visually readable in a predetermined wavelength range. If for example the dye is transmissive only in respect of infra-red light, the diffraction structure 8 is concealed from the naked eye and can be perceived only by means of a reading device (not shown here) which can detect the presence of the diffraction structure 8.

The subsequently applied adhesive layer 6 of typically less than 6 micrometers in thickness permits the laminate 7 to be glued onto the substrate 9. The thickness of the adhesive layer 6 is advantageously suited to the surface nature of the substrate 9. When dealing with smooth substrates, for example in the case of photographic paper, 3 micrometers thickness for the adhesive layer 6 is sufficient, while when dealing with a rough substrate 9, the adhesive layer 6 advantageously involves a thickness of 6 micrometers or more. When dealing with a paper with a normal surface structure for example the thickness of the adhesive layer 6 is about 5 micrometers.

Heat-activatable hot adhesives are provided for the adhesive layer 6, for example based on polymethylmethacrylate, which develop their adhesive power when heated as from about 80° C. However the laminate 7 can only be released again from the substrate 9 at a temperature of the hot adhesive of more than 170° C. without excessive tensile forces which destroy the layers 3 through 5 occurring in the laminate 7.

The finished laminate 7 leaves the re-rolling installation for example in the form of a roll which has graphic compositions comprising diffraction structures 8 which produce optical effects of the above-indicated kind.

Figure 2:
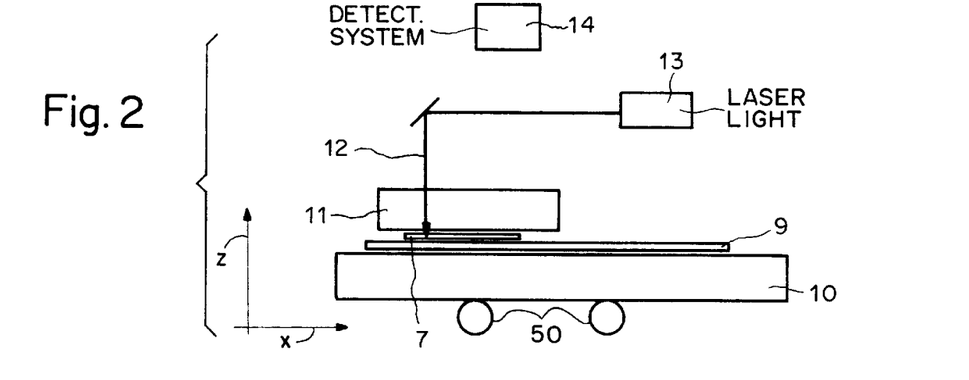
FIG. 2 shows a device for gluing the composite laminate onto the substrate.

FIG. 2 is a view which is not to scale in the xz-plane of a device for gluing the laminate 7 onto the substrate 9. The substrate 9 lies in a xy-plane perpendicular thereto on a flat plate 10. The laminate 7 is pressed against the substrate 9 and the plate 10 by means of a second plate 11 so that the laminate 7 lies in direct contact and uniformly on the substrate 9. The light beam 12 of a laser light source 13, which light beam is controlled by a control device, for example a computer, passes through the plate 11 which is transparent in respect thereto onto the laminate 7 and causes local heating of the laminate 7 at the illuminated location. The device optionally includes a system 14 for detecting the xy-position of the substrate 9 so that the position of the laser beam 12 can be exactly oriented to the xy-position of the substrate 9. That permits the security element to be applied to the substrate 9 in accurate register relationship. The laser light source 13 includes a laser and also an optical system which is necessary for beam guidance and beam focusing.

The detection system 14 is connected to the control device which is provided for guiding and controlling the laser beam 12. It can be based on various principles. Examples are image detection of graphic elements which are printed on the substrate 9, detection of the edge of the substrate 9 or detection of markings provided on the substrate 9, for example a metal thread which is present in the case of banknotes.

The detection system 14 can also be designed to ascertain the precise position of surface portions which are present on the laminate 7 and which represent elements provided with diffraction structures 8 so that selected, accurately defined elements of the laminate 7 can be transferred onto the substrate 9.

If the detection system 14 is designed to ascertain both the xy-position of the substrate 9 and the xy-position of the laminate 7 and if the arrangement further includes a positioning system 50 with which the laminate 7 and the substrate 9 can be oriented relative to each other in their xy-positions, then individual elements of the laminate 7 can be transferred onto the substrate 9 in proper register relationship.

Cylinders may also be provided in place of the plates 10 and 11. In that case, direct contact occurs between the adhesive layer 6 and the substrate 9, only on a locally limited surface area. Cylinders are suitable in particular in a re-rolling installation for gluing substrates 9 and laminates 7 which are wound in the form of strips onto rolls. Mutual positioning of the substrate 9 and the laminate 7 in the x-direction is then a simple matter insofar as the corresponding rolls of the re-rolling installation are rotated until the two strips are in the correct register relationship. Positioning in the y-direction can be effected either by displacement of the substrate 9 or by displacement of at least one of the rolls of the re-rolling installation. Preferably positioning in the y-direction is effected by displacement of a single roll of the re-rolling installation as the inertia of the foil strip is very low. Displacement of a single roll is sufficient as, with the correct basic setting of the installation, only small displacements are necessary, which do not distort the foil strip.

The optical properties of the reflection layer 4 (FIG. 1) of the laminate 7 determine whether either the laser beam 12 can pass through the reflection layer 4 and can directly heat the subjacent layers 5, 6 (FIG. 1) or whether the laser beam 12 is at least partially absorbed in the reflection layer 4 and heats the reflection layer 4 so that the adhesive layer 6 is heated only as a result of heat conduction from the reflection layer 4 into the adhesive layer 6. As a further possibility, it is possible to provide for the lacquer layer 3 (FIG. 1) a lacquer which has a high degree of absorption in the region of the wavelength of the laser light so that the laser beam 12 predominantly heats the lacquer layer 3. As the lacquer layer 3, the reflection layer 4 and the adhesive layer 6 are very thin, the amount of heat which passes into the adhesive layer 6 is comparatively high so that the adhesive layer 6 can be locally heated to the required activation temperature at very small surface areas of the order of magnitude of $10^{-10} m^2$.

The thermal properties of the lacquer layers 3, 5 (FIG. 1), the reflection layer 4 and the adhesive layer 6 are so matched to each other that the temperature required for activation of the adhesive layer 6 is below the temperature at which the diffraction structures 8 (FIG. 1) are irreversibly destroyed. The power density of the laser beam 12 and the local exposure time of the laminate 7 are now also predetermined in such a way that on the one hand the adhesive layer 6 is so greatly heated that after cooling it provides for a high degree of adhesion between the exposed part of the laminate 7 and the substrate 9, and that on the other hand the diffraction structures 8 are not damaged or destroyed by the heating effect. The activation temperature of the adhesive layer 6 is for example 80° C. while the diffraction structures 8 are only destroyed at temperatures between 150° and 160° C. The hot adhesives of the adhesive layer 6, which are matched to those temperatures, are intimately joined to the substrate 9 and after cooling have such a high level of adhesion that for example a paper substrate 9 is damaged in the event of an attempt at detachment. In the event of such an attempt at detachment, there is then also a great probability that the diffraction structures 8 of the laminate 7 or the layer structure or the integrity of the pattern are damaged. It is also preferable to use a lacquer for the lacquer layers 3, 5, in which the diffraction structures 8 which are embossed into the lacquer layers 3, 5 are already thermally irreversibly destroyed at temperatures between 150° and 160° C. so that detachment of the laminate 7 at 170° C. is pointless. If the temperatures in the attempt at detachment are somewhat below 170° C., tensile forces destroy the soft layers 3 through 5.

Figure 3:
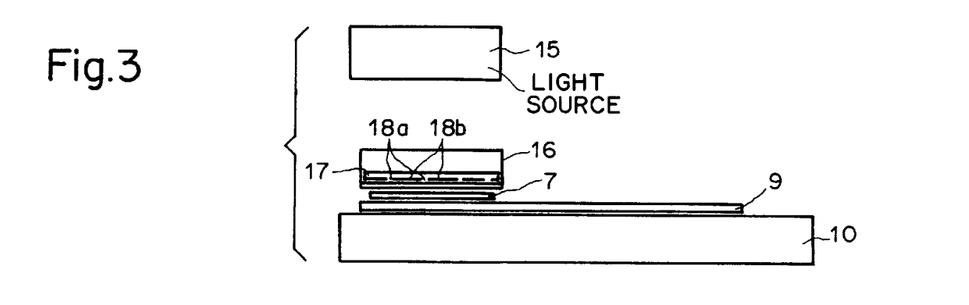
FIG. 3 shows a second device for gluing the composite laminate onto the substrate.

FIG. 3 shows a further device for gluing the laminate 7 (FIG. 1) onto the substrate 9. Instead of the laser light source 13 the device has a light source 15 which serves for heating purposes, and a unit 16 for masking the light which is produced by the light source 15. Masks 17 of all kinds can be used for the masking effect, the mask 17 comprising locations 18a and 18b which are transparent and non-transparent in relation to the light of the light source 15. For example a foil or glass plate which is partially coated with a non-transparent material can serve as the mask 17. The mask 17 can be arranged in the immediate vicinity of the laminate 7 or the image thereof can be projected onto the plane of the laminate 7 by means of an optical system (not shown). It is further possible to use as the mask 17 a spatial light modulator (SLM), for example a liquid crystal display (LCD) which includes a matrix of addressable pixels. In that case each pixel is transparent or non-transparent according to its actuation. Many surface portions of the laminate 7 can be simultaneously heated and glued fast on the substrate 9, with such a device.

Figure 4:
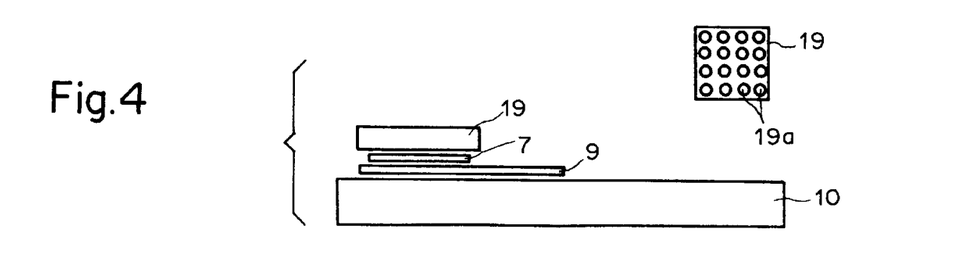
FIG. 4 shows a third device for gluing the composite laminate onto the substrate.

A third device is shown in FIG. 4. The heat light source used is an addressable one-dimensional or two-dimensional array 19 of laser or light emitting diodes 19a which are arranged for example at a mutual spacing of 0.1 mm.

Instead of using the plate 11 shown in FIG. 2, electrostatic means may be provided to produce uniform direct contact between the adhesive layer 6 of the laminate 7 and the substrate 9. It would also be possible to produce an air flow to achieve the necessary surface contact between the items 7 and 8 to be glued together. The array 19 (FIG. 4) can also be brought into direct contact with the laminate 7 so that on the one hand there is uniform surface contact between the adhesive layer 6 and the substrate 9 and on the other hand a very high level of optical resolution of typically 300 dpi of the pixel-oriented pattern of the laminate 7, which is to be transmitted onto the substrate 9 by the individual laser diodes 19a, is guaranteed. An even higher degree of resolution can even be achieved by optical projection of the image of the array 19 onto the plane of the laminate 7.

It is naturally also possible for parts of the laminate 7 to be fixed on the substrate 9 with a device as shown in FIG. 2 and for other parts of the laminate to be fixed on the substrates 9 with a device as shown in FIG. 3 or FIG. 4. In that respect the choice of the device depends on the number to be produced of the substrate 9 to be provided with the laminate 7. The use of a light source 15 (FIG. 3) which provides a lighting effect over a surface area, and masks 17, instead of the controlled laser beam 12 (FIG. 2), permits high through-put rates, but on the other hand the use of the laser beam 12 affords the advantage of greater flexibility when dealing with small numbers. The two advantages of the high through-put rates and the high degree of flexibility are combined in the case of spatial light modulators as in the case of arrays with laser or light emitting diodes and are used in particular in the mass production of documents such as for example banknotes.

In a first form of the use, a surface portion which includes for example a self-contained predetermined composition of the diffraction structures 8 is cut or stamped as a tag or stamp out of the laminate as shown in FIG. 1. The tag is arranged on the substrate 8, for connection thereto. The adhesive layer 6 is then softened at predetermined locations by means of one of the above-described devices and glued to the substrate 9. After cooling and hardening of the hot adhesive the tag is locally fixedly joined to the substrate 9 in a predetermined pattern.

The tag for example is of a circular shape measuring 2 cm in diameter and is typically 25 micrometers in thickness. The tags may also be cut out in different sizes and may be of oval, rectangular or other shapes in terms of their contour. Their shape and their dimensions are predetermined for example by the graphic composition of the diffraction structures 8.

Suitable substrates 9 are for example papers or plastic materials of different surface nature as occurs in the case of photographic papers, passes, documents, value-bearing papers, banknotes, checks, etc.

In a second form of the use the laminate 7 is brought into contact with the substrate 9, possibly in accurate register relationship, and also glued to the substrate 9 by means of one of the above-described devices. After the adhesive layer 6 has cooled the carrier foil 1,2 is pulled off in a subsequent working operation. In that case the intermediate layer 2 is detached from the lacquer layer 3 at those locations of the laminate 7 which have been previously sufficiently heated and thus adhere to the substrate 9. At the locations of the adhesive layer 6 which do not adhere to the substrate 9 the intermediate layer 2 is not detached from the lacquer layer 3 and the layers 3, 4, 5, 6 tear along the boundary between the adhering and the non-adhering locations so that the layers 3, 4, 5, 6 remain behind on the substrate 9 at the adhering locations of the laminate 7.

If necessary the substrate 9 can then be covered with a transparent protective layer in order for the layers 3, 4, 5, 6 of the laminate 7, which have locally remained behind on the substrate 9, to be protected from mechanical abrasion or alteration.

The use of a guided laser beam 12 (FIG. 2) makes it possible to produce extremely fine lines which are typically a few tens of micrometers, for example 60 micrometers, in width, but which in the extreme case may also be a few micrometers, for example 5 micrometers wide. A line pattern which is produced in that way is comparable in terms of its fineness to a line pattern produced by intaglio printing. The line pattern formed from diffraction structures 8 (FIG. 1) reflects back light impinging thereon, according to the configuration of the diffraction structures, in a predetermined spatial angle range. Because of the high level of intensity of the diffracted light, it is also possible to perceive fine patterns, for example in the form of fine lines, or an arrangement of small surface elements, without aids. On the other hand fine objects of that kind represent very fragile structures which are damaged in the event of any attempt at detachment from the substrate 9. Even an arrangement of individual surface elements whose dimensions typically lie in the range of 10 through 100 micrometers cannot be removed from the substrate 9 and re-applied, without perceptible alteration.

The use of the guided laser beam 12 further permits the laminate 7 to be applied to the substrate 9 in accurate register relationship, in two different respects. On the one hand it is possible by means of the detection system 14 (FIG. 2) to establish with a high degree of accuracy the position of patterns which are printed for example on the substrate 9, and then to guide the laser beam 12 in accordance with the position of those patterns, so that after the carrier foil has been pulled off, parts of the laminate 7 remaining on the substrate 9 are aligned with the patterns in accurate register relationship. It is possible for example to apply to a document a guilloche of which individual lines are printed and individual lines are glued on as laminate 7 with diffraction structures 8. A further option involves applying parts of a graphic element, a character or a figure etc. with printing ink, and forming the parts supplementing the element, the character or the figure respectively in correct register relationship in the form of a transferred laminate 7 with diffraction structures 8. That combination of different technologies gives a high degree of security in regard to forgeries and manipulation operations.

Secondly it is possible to provide as the security element a laminate 7 which has a predetermined design of elements such as for example lines, pixels, dots, surface elements etc., which contain special diffraction structures 8 which in their co-operation for example produce an optical effect as are known from products which are marketed under the trade mark name KINEGRAM®. Now, as described above, the detection system 14 is designed to detect the position of that design so that the laser beam 12 can be accurately guided over the elements of the design. After the carrier foil has been pulled off that design then remains behind on the substrate 9. On the one hand fine details such as for example very narrow lines can be transferred from the laminate 7 onto the substrate 9, with that technology. On the other hand, it is possible to use a laminate 7 with a strongly reflecting reflection layer 4, which guarantees a high degree of brilliance in respect of the transferred diffraction structures 8. In general only a fraction of the surface occupied by an optical security element such as a KINEGRAM® is provided with diffraction structures 8. The remainder of the surface is not active from the optical diffraction point of view and can act in particular as a mirror. Insofar as only those surface portions of the laminate 7 which contain diffraction structures 8 are transferred onto the substrate 9, the substrate 9 is also only partially covered within the surface associated with the optical security element. By virtue of the strongly reflecting reflection layer 4, the optical-diffraction security element nonetheless appears in a state of high brilliance. At the same time the substrate 9 therebeneath is visually accessible in the surface portions which are not covered, as if no security element had been transferred. A photograph or information present on the substrate 9 can then on the one hand be read visually and/or by machine and on the other hand is protected from alteration due to the security element which was transferred in finely structured form.

Figure 5:
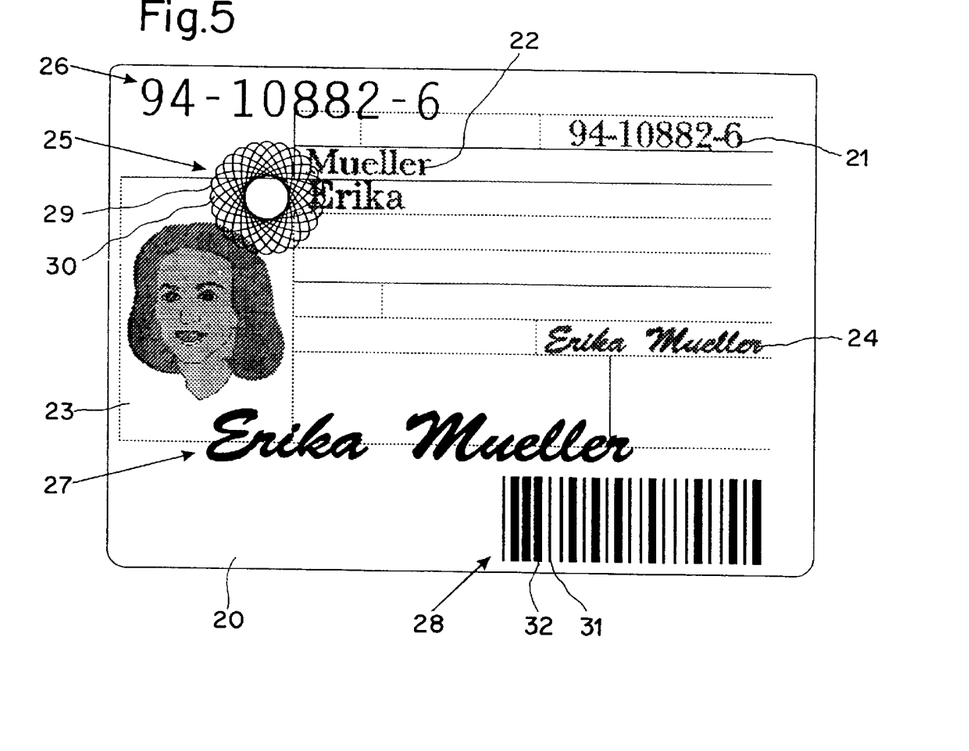
FIG. 5 shows a pass with security elements.

For further illustration FIG. 5 shows a pass 20 onto which a number 21 and the name 22 of a person are applied by printing. The pass or identity card 20 further includes a photograph 23 of the person and is provided with the signature 24 of the person, in writing. To afford protection from forgery or imitation, the pass is provided with four security elements 25 through 28 which are in the form of a composite laminate 7 (FIG. 1) with optical diffraction structures 8. FIG. 5 shows only the contours of the security elements 25 through 28, but not their optical effects. The security element 25 comprises fine lines 29 which form for example a guilloche pattern. The lines 29 cover over parts of the photograph 23 and part of the name 22 while in the intermediate spaces 30 the photograph 23 and the name 22 respectively are not covered and are thus visible. The security element 25 serves to prevent replacement of the photograph 23 and alterations to the name 22. The security element 26 is a number which is identical to the number 21. The contours of the security element 27 represent the signature 24 in enlarged form. The number 21 and the signature 24 therefore also can no longer be altered without this being noticeable. Finally the security element 28 represents one of the known machine-readable bar codes.

The shape and the appearance of the security element 25 are independent of the data individualising the pass 20 such as name 22, number 21 or other data such as address, nationality, biometric data etc. Therefore the security element 25 could also be a composite laminate which is glued on over its full area, which is known from European patent specification No. 401 466, and which includes lines 29 and transparent intermediate spaces 30. However, with the above-described procedure, individual ones of the lines 29 can also be applied by a printing process and the remaining lines can be added to the printed lines in accurate register relationship from a foil in the form of a laminate 7. The shape of the security elements 26 through 28 is dependent on data which are also stored in another form on the pass 20. The security elements 26, 27 and 28 are produced for example from a laminate 7 (FIG. 1) by gluing and then pulling off the carrier foil 1, 2, in which case the laminate 7 contains diffraction structures 8 whose reliefs have diffraction structures 8 which are virtually independent of location, over a relatively large surface area. An example of a diffraction structure 8 which is invariant in relation to local translations is a grating with straight grating grooves. Examples of diffraction structures 8 which are virtually invariant in relation to local translations are grating-like structures in which the parameters of line spacing, orientation and profile shape change only comparatively little over a dimension of the order of magnitude of the register accuracy to be achieved. An example of such a structure is a grating with curved grating grooves if the curvature changes only slowly over a plurality of grating grooves. As the optical effect of such a diffraction structure 8 is independent of or only slightly dependent on its xy-position, small displacements of the carrier foil 1, 2 in the xy-plane relative to the substrate 9 produce scarcely any alterations in the optical effects which are to be produced for example by the figures of the security element 26 or the signature 27. The figures of the security element 26 can thus be easily produced on the pass 20 without apparent adverse effect in terms of their optical action, as with a virtually locationally invariant configuration of the diffraction structures 8, there is no need for accurate mutual orientation as between the pass 20 and the laminate 7 producing the security element 26.

Figure 6:
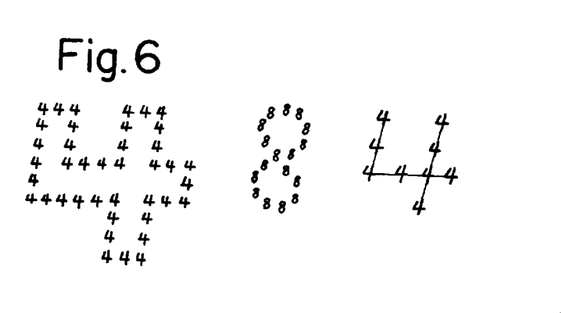
FIG. 6 shows a figure in microscript.

When the security element 26 is of a nature such as to be particularly safeguarded against forgery, as shown in FIG. 6 by means of various examples, each figure is formed from a microscript which contains the same figure a number of times in reduced form. Thus for example the lines which form the figure "4" are not formed from dots or lines but from smaller figures "4".

The lines of the figure "8" are formed from small figures "8". Each figure therefore represents an image made up of many small figures of the same kind. In that respect it is preferable for the small figures to be joined together so that an interconnected character is produced on the pass 20. A laser beam 12 (FIG. 2) is particularly suitable for producing that. A forgery in which a figure "3" was made from the figure "8" by removal of the corresponding part of the figure "8" is thus easily recognisable, if not directly by the naked eye, then at least with an aid such as magnifying glass. In another method for transferring the number 26, there is provided a strip which is rolled on a roll and which includes in a recurring succession surfaces associated with the FIGS. 0 1 2 . . . 9. The surface associated with a given figure contains the figure and/or text preferably in microscript in the form of a virtually endless pattern. Further parts of those surfaces may include additional, visually perceptible or machine-readable elements. In the transfer operation the surface of the figure is illuminated and heated. Then, within the contour of the transferred figures, the same figure and/or text can be recognised several times in the form of elements which have an optical-diffraction action.

The special bar code 28 in FIG. 5 is formed from narrow and wide strips 31 and 32 respectively, each strip or bar 31 representing a binary digit "0" and each strip or bar 32 representing a binary digit "1". The strips 31 and 32 contain diffraction structures 8 which diffract the light of a reading light beam of a reading device, which impinges on the diffraction structures 8 in a predetermined direction, onto photodetectors which are suitably arranged in the reading device. When using specific diffraction structures 8, for example a grating with asymmetrical profile shape, it is possible to diffract the light of the reading light beam into sub-beams with a predefined distribution in terms of intensity. The reading device is advantageously designed to analyse the ratio of the different levels of intensity which are measured by the photodetectors. In that way it is possible to check the authenticity of the bar code 28 on the basis of the specific optical-diffraction properties of the diffraction structures 8. The bar code 28 can further be so designed that the strips 31, 32 remain concealed from the naked human eye. It is also possible to produce bar codes 28 whose strips 31, 32 are designed for example in accordance with the standard of MIL-STD-1189 or in accordance with the "European Article Numbering Code".

It is advantageous to draw with the laser beam 12 (FIG. 2) an interconnected line, for example the lines 29 of the guilloche pattern, or the characters of the signature of the security element 27.

Figure 7:
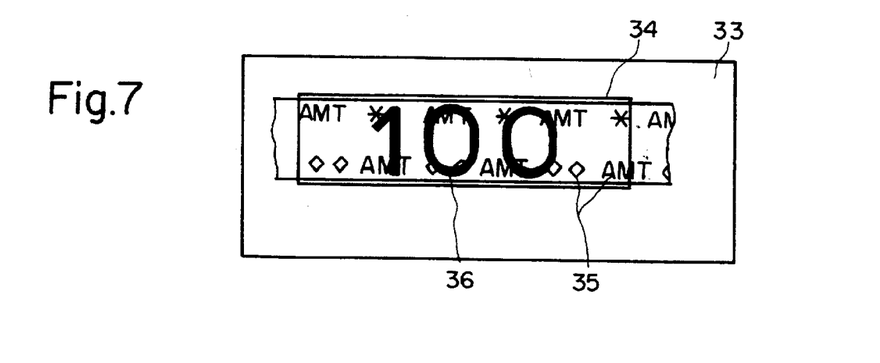
FIG. 7 shows a check.

FIG. 7 shows a further example of use. A check or a value-bearing paper or security bond 33 has a strip 34 into which the drawer is to write an amount of money 36 specifying the value of the check or paper or security bond 33. In order to prevent the amount of money 36 from being forged, it is provided that figures corresponding to the amount of money 36 are to be transferred from a foil in the form of a laminate 7 (FIG. 1) with predetermined patterns 35 which produce predetermined optical-diffraction effects when the pattern 35 is viewed and moved under normal lighting conditions, by a procedure whereby the laser beam 12 (FIG. 2) writes the figures or the addressable array 19 of laser diodes (FIG. 4) forms the figures so that, after the carrier foil has been pulled off, only the figures remain behind on the check 33. The parts of the pattern 35 which appear in the figures represent a security feature by virtue of the diffraction structures 8. There is no possibility therefore of adding new figures or altering existing figures, without leaving behind traces.

Figure 8:
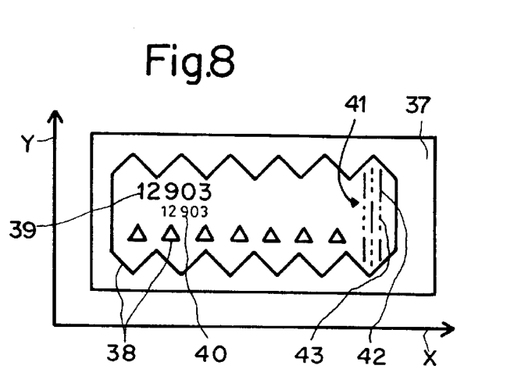
FIGS. 8 and 9 show a banknote.
Figure 9:
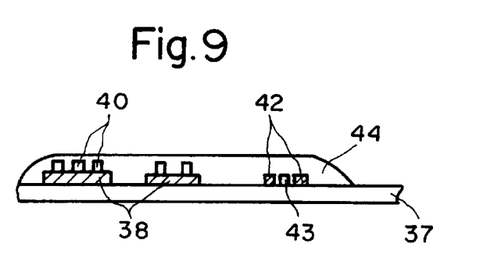

The method with the controlled laser beam 12 is particularly suitable for applying a security element in accurate register relationship to a document which is to be protected from forgery, such as for example a banknote. FIGS. 8 and 9 are a plan view and a view in cross-section of a banknote 37 which is printed with patterns 38 and with a serial number 39 and has a security element 40 which represents the same number 39. The banknote also has lines 41 which are composed of line portions 42 and 43 of first and second kinds. The line portions 42 and 43 are shown in FIG. 8 in solid and dotted form, respectively. In production with a device as is shown in FIG. 2, the control device, by means of the detection system 14, ascertains the precise xy-position of the banknote 37 and the value of the number 39. The security element 40 is produced from a laminate 7 (FIG. 1) with optical diffraction structures 8 by a procedure whereby the control device so controls the laser beam 12 that the read number 39 is now produced in accurate register relationship by local bonding of the laminate 7 to the banknote 37 and subsequent removal of the carrier foil 1, 2 (FIG. 1). The figures and/or characters of the number 40 can be provided in accordance with one of the variants shown in FIG. 6.

The line portions 42 are for example lines which are produced by an intaglio printing procedure with a predetermined printing ink, while the line portions 43 are also lines which are applied with one of the above-described methods as a laminate 7 with diffraction structures 8 (FIG. 1) which are added in accurate register relationship to the line portions 42. The line portions 43 produce varying optical effects of the kind described hereinbefore. The lines formed from the line portions 42 and 43 may represent any geometrical patterns. By virtue of mutual alignment in accurate register relationship, they form a further security feature which can be easily checked by the naked eye. The line portions 42 can also be printed on with an invisible dye or a fluorescing dye so that it is possible for the authenticity of the security feature to be verified only with suitable aids. This combination of printing procedure and optical-diffraction security procedure is also highly suitable for the production of digits which are difficult to forge for the number 40, insofar as the respective surface or line representing the individual digit alternately comprises printing ink and a laminate 7, like the lines 41 formed from line portions 42 and 43. For a viewer the digit can be clearly perceived both in the line portions 42 and also in the line portions 43. An alteration to the value of the number 40 is made difficult by virtue of the fact that the information would have to be altered in two different technologies and in proper register relationship. The register relationship of the two configurations of the digits can be visually checked without aids and therefore forms an additional security feature.

It is possible in a further method step to apply a protective layer 44 which is locally limited or which covers a full surface area and which is transparent in relation to visible light, for example comprising an UV-hardenable lacquer, in order to protect the diffracting line elements of the number 40 and the lines 41 from mechanical abrasion.

Figure 10:
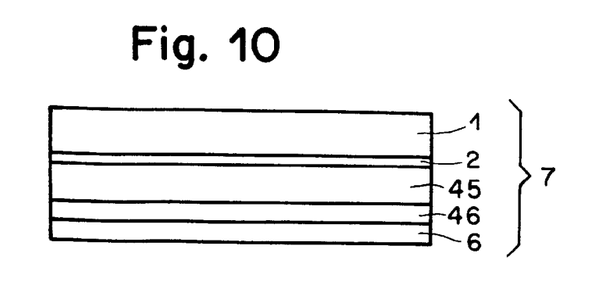
FIG. 10 shows a further composite laminate.

In place of a laminate 7 (FIG. 1) in which diffraction structures 8 produce optical-diffraction effects, it is also possible to provide a laminate 7 having layers producing interference effects, as shown in FIG. 10, so that when the laminate is tilted and/or turned, under normal lighting conditions, changing color effects occur in a predetermined manner.

In FIG. 10 reference numeral 1 again denotes a carrier layer on which there are disposed in the specified sequence an intermediate layer 2, a pack of layers 45, optionally a lacquer layer 46 and a heat-activatable adhesive layer 6. The intermediate layer 2 serves to provide predetermined adhesion and detachment characteristics as between the carrier layer 1 and the layer pack 45. The lacquer layer 46 possibly serves to increase the adhesion between the layer pack 45 and the adhesive layer 6. To produce predefined interference effects the layer pack 45 is in the form of a succession of thin layers of dielectric and/or absorbent materials, for example metals, which in their interaction produce the optical interference effects. Possible effects are for example predefined changes in color when the layer pack 45 is tilted. Suitable dielectric materials are $MgF$, $SiO_2$, $Al_2O_3$, $TiO_2$ and $ZnS_1$, as a non-limiting list. Typical layer thicknesses are 10 through 200 nanometers. In addition in that connection the layers of the layer pack 45 may be locally structured.

Layers producing interference effects can be applied in locally structured form to the substrate 9 by means of the above-described methods. The combination of layer packs 45 which produce different interference phenomena is particularly advantageous. Different color changes can be used as mutual referencing insofar as for example a first surface portion changes its color from red to green when it is tilted and an adjacent surface changes its colour from green to blue. Then, particularly under poor lighting conditions, the change in colour of the two surface portions can be better recognised. Geometrical patterns with a predefined local change in color upon tilting can be achieved by different layer packs 45 being transferred onto the substrate 9 in succession, if need be in accurate register relationship.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of transferring a security element onto a substrate, wherein said security element comprises a composite laminate comprising at least one carrier foil, a thermally activatable adhesive layer for connection to said substrate, a metallic reflection layer between said carrier foil and said adhesive layer, and optical diffraction structures and/or a layer pack of layers producing interference effects, the method comprising contacting said adhesive layer with said substrate, and supplying energy through said laminate to locally heat said adhesive layer at plural locations so that said laminate adheres to said substrate at the heated locations without said diffraction structures or said layer pack being destroyed, wherein said energy required for locally heating said adhesive layer is supplied by shining a laser beam onto said composite laminate from the carrier foil side.

2. A method according to claim 1 wherein said laser beam supplies said energy along a continuous line.

3. A method according to claim 1 wherein, after the step of adhering said adhesive layer to said substrate said carrier foil is pulled off, such that at the locations where said adhesive layer adheres to said substrate said carrier foil is detached from the remaining layers of said laminate and said remaining layers tear along the boundary between the adhering and the non-adhering locations so that said remaining layers remain behind on the substrate only at the adhering locations.

4. A method according to claim 3 wherein the method includes detecting the xy-position of said substrate by means of a detection system and aligning the position of said laser beam with the xy-position of said substrate when transferring said laminate.

5. A method according to claim 4 including aligning the xy-positions of said substrate and said laminate with each other by means of a positioning system.

6. A method according to claim 3 wherein said laminate has surface portions provided with the diffraction structures and the method includes detecting the xy-position of said laminate by means of a detection system and aligning the position of said laser beam with the xy-position of said laminate when transferring said laminate.

7. A method according to claim 6 including aligning the xy-positions of said substrate and said laminate with each other by means of a positioning system.

8. A method according to claim 3 including covering said substrate with a protective layer to protect said layers which have locally remained behind at said adhering locations from mechanical abrasion or alteration.

9. A method according to claim 3 wherein said security element includes a plurality of characters, and wherein the surface area occupied by each of said characters contains many small characters of the same kind.

10. A method according to claim 4 wherein said substrate is a document to which are applied patterns or characters which are composed of line portions of first and second kinds, the line portions of the first kind comprising printing ink and the line portions of the second kind being provided by said laminate, said line portions of the first and second kinds being oriented in accurate register relationship with each other.

11. A method according to claim 6 wherein said substrate is a document such as a banknote to which are applied patterns or characters such as digits which are composed of line portions of first and second kinds, the line portions of the first kind comprising printing ink and the line portions of the second kind being provided by said laminate, said line portions of the first and second kinds being oriented in accurate register relationship with each other.

12. A method according to claim 3 for a substrate which is a value-bearing paper whose value is fixed by specifying an amount of money, wherein the digits representing the amount of money are transferred as said security element.

13. A method according to claim 12 wherein said value bearing paper is a check.

* * * * *